United States Patent [19]
Manev et al.

[11] Patent Number: 5,766,800
[45] Date of Patent: Jun. 16, 1998

[54] HIGHLY HOMOGENEOUS SPINEL $LI_{1+x}MN_{2-x}O_{4+Y}$ INTERCALATION COMPOUNDS AND METHOD FOR PREPARING SAME

[75] Inventors: Vesselin Manev; Titus Faulkner, both of Gastonia, N.C.

[73] Assignee: FMC Corporation, Philadelphia, Pa.

[21] Appl. No.: 867,160

[22] Filed: Jun. 2, 1997

Related U.S. Application Data

[62] Division of Ser. No. 665,408, Jun. 18, 1996, Pat. No. 5,718,877.

[51] Int. Cl.⁶ .......................... H01M 4/50; C01G 45/12
[52] U.S. Cl. ............................ 429/224; 423/599
[58] Field of Search .................. 429/224, 218; 423/599, 592, 593; 252/182.1

[56] References Cited

U.S. PATENT DOCUMENTS

| | | |
|---|---|---|
| 4,246,253 | 1/1981 | Hunter . |
| 4,246,324 | 1/1981 | de Nora et al. . |
| 4,312,930 | 1/1982 | Hunter . |
| 4,366,215 | 12/1982 | Coetzer et al. . |
| 4,448,856 | 5/1984 | Zuckerbrod et al. . |
| 4,507,371 | 3/1985 | Thackeray et al. . |
| 4,546,058 | 10/1985 | Charkey et al. . |
| 4,599,157 | 7/1986 | Suzuki et al. . |
| 4,731,309 | 3/1988 | Hoffman . |
| 4,732,741 | 3/1988 | Duncan et al. . |
| 4,749,634 | 6/1988 | Sammells . |
| 4,828,834 | 5/1989 | Nagaura et al. . |
| 4,946,664 | 8/1990 | Van Zyl et al. . |
| 4,956,247 | 9/1990 | Miyazaki et al. . |
| 4,975,346 | 12/1990 | Lecerf et al. . |
| 5,023,155 | 6/1991 | Charkey et al. . |
| 5,030,523 | 7/1991 | Neat et al. . |
| 5,110,696 | 5/1992 | Shokoohi . |
| 5,135,732 | 8/1992 | Barboux et al. . |
| 5,153,081 | 10/1992 | Thackeray et al. . |
| 5,166,012 | 11/1992 | Roussouw et al. . |
| 5,169,736 | 12/1992 | Bittihn et al. . |
| 5,192,629 | 3/1993 | Guyomard et al. . |
| 5,196,278 | 3/1993 | Idota . |
| 5,211,933 | 5/1993 | Barboux et al. . |
| 5,240,794 | 8/1993 | Thackeray et al. . |
| 5,244,757 | 9/1993 | Takami et al. . |
| 5,266,299 | 11/1993 | Tarascon . |
| 5,288,474 | 2/1994 | Reichert et al. . |
| 5,290,592 | 3/1994 | Izuchi et al. . |
| 5,312,611 | 5/1994 | Takani et al. . |
| 5,316,875 | 5/1994 | Murai et al. . |
| 5,389,467 | 2/1995 | Herr et al. . |
| 5,415,957 | 5/1995 | Okada et al. . |
| 5,425,932 | 6/1995 | Tarascon . |
| 5,429,890 | 7/1995 | Pynenburg et al. . |
| 5,443,929 | 8/1995 | Yamamoto et al. . |
| 5,449,577 | 9/1995 | Dahn et al. . |
| 5,462,820 | 10/1995 | Tanaka . |
| 5,474,959 | 12/1995 | Schäet al. . |
| 5,478,671 | 12/1995 | Idota . |
| 5,478,672 | 12/1995 | Mitate . |
| 5,478,673 | 12/1995 | Funatsu . |
| 5,478,675 | 12/1995 | Nagaura . |
| 5,478,676 | 12/1995 | Turi et al. . |
| 5,487,960 | 1/1996 | Tanaka . |
| 5,489,492 | 2/1996 | Asami et al. . |
| 5,494,762 | 2/1996 | Isoyama et al. . |
| 5,496,664 | 3/1996 | Sterr . |
| 5,506,077 | 4/1996 | Koksbang . |
| 5,601,952 | 2/1997 | Dasgupta et al. . |

FOREIGN PATENT DOCUMENTS

| | | |
|---|---|---|
| WO 96/34423 | 10/1996 | European Pat. Off. . |
| 2 270 195 | 3/1994 | United Kingdom . |
| PCT/US95/13106 | 10/1995 | WIPO . |

OTHER PUBLICATIONS

*Lithium Insertion Into Manganese Spinels*, M.M. Thackeray, et al.; *Mater. Res. Bull.*, vol. 18, (1983) pp. 461–472. No month.

*Improved Capacity Retention in Rechargeable 4 V Lithium/Lithium–Manganese Oxide (Spinel) Cells*; Gummow et al.; *Solid State Ionics* 69 (1994). No month.

*Crystallographic And Magnetic Properties Of Several Spinels Containing Trivalent JA–1044 Manganese*; D.G. Wickham and W.J. Croft; *J. Phys. Chem. Solids*, vol. 7, (1958) pp. 351–360. No month.

*Rechargeable Lithium Battery With Spinel–Related $\lambda$–$MnO_2$*; I. *Synthesis of $\lambda$–$MnO_2$ i for Battery Applications*; *Journal of Power Sources*, 43–44 (1993) pp. 551–559. No month.

*Rechargeable Lithium Battery With Spinel–Related $MnO_2$*; II. *Optimization of the $LiMn_2O_4$ Synthesis Conditions*; Momchilov et al.; *Journal of Power Sources*, 41 (1993) pp. 305–314. No month.

(List continued on next page.)

*Primary Examiner*—Anthony Skapars
*Attorney, Agent, or Firm*—Bell Seltzer Intellectual Property Law Group Alston & Bird LLP

[57] ABSTRACT

A novel method of preparing a spinel $Li_{1+x}Mn_{2-x}O_{4+Y}$ intercalation compound with low lattice distortion and a highly ordered and homogeneous structure for 4 V secondary lithium and lithium ion cells is provided. The method of preparing the spinel $Li_{1+x}Mn_{2-x}O_{4+Y}$ intercalation compound comprises providing a spinel $Li_{1+x}Mn_{2-x}O_4$ intercalation compound having a lithium to manganese mole ratio of between about 1.02:2 and 1.1:2 and firing the spinel at different temperature ranges with corresponding gas flow rates to form the spinel $Li_{1+x}Mn_{2-x}O_{4+Y}$ intercalation compounds. The spinel $Li_{1+x}Mn_{2-x}O_{4+Y}$ intercalation compounds have a mean X value of between about 0.01 and 0.05, a mean Y value of between about −0.02 and 0.04 and a full width at half maximum of the x-ray diffraction peaks at a diffraction angle 2θ of planes (400) and (440) using $CuK\alpha_1$ rays of between about 0.08° and 0.13°. The spinel $Li_{1+x}Mn_{2-x}O_{4+Y}$ intercalation compounds may be used in the positive electrodes of secondary lithium and lithium ion cells to provide cells having high specific capacities and long cycling lives.

12 Claims, 5 Drawing Sheets

OTHER PUBLICATIONS

*The Chemistry Of LiMn$_2$O$_4$ Formation*; W. F. Howard, Jr. No date.

*Rechargeable Lithium Battery With Spinel–Related λ–MnO$_2$; Part III. Scaling–Up Problems Associated With LiMn$_2$O$_4$ Synthesis;* V. Manev et al.; *Journal of Power Sources,* (1995) pp. 1–6. No month.

*Thermogravimetric analysis to determine the lithium to manganese atomic ratio in Li$_{1+x}$Mn$_{2-x}$O$_4$;* Gao et al; *320 Applied Physics Letters;* 66(1995)8 May, No. 19.

HIGHLY HOMOGENEOUS SPINEL $LI_{1+x}MN_{2-x}O_{4+y}$ INTERCALATION COMPOUNDS AND METHOD FOR PREPARING SAME

This application is a division of application Ser. No. 08/665,408, filed Jun. 18, 1996 now U.S. Pat. No. 5,718,877.

FIELD OF THE INVENTION

This invention relates to spinel $Li_{1+x}Mn_{2-x}O_{4+y}$ intercalation compounds, and particularly to the use of spinel $Li_{1+x}Mn_{2-x}O_{4+y}$ intercalation compounds in 4 V secondary lithium and lithium ion batteries.

BACKGROUND OF THE INVENTION

Heretofore, lithium intercalation compounds such as $LiMn_2O_4$ have been used in positive electrodes for 4 V secondary lithium and lithium ion batteries. The spinel $LiMn_2O_4$ intercalation compound was first obtained by Wickham and Croft by heating lithium carbonate and manganese oxide in 1:2 lithium to manganese molar ratio. D. G. Wickham and W. J. Croft, *J. Phys. Chem. Solids*, 7, 351 (1958). Wickham and Croft also reported that using an excess of lithium in the reaction mixture led to formation of $Li_2MnO_3$, while an excess of manganese led to a mixture containing $Mn_2O_3$. These two compounds are intermediate products of the solid state chemical reactions which take place during the high temperature spinel synthesis of the spinel $LiMn_2O_4$ and can be present at any time when the reactions are not fully completed. W. Howard, *Ext. Abstr.*, 7 IMLB, 281 (Boston, 1994)

As demonstrated in U.S. Pat. No. 4,426,253 to Hunter, the acid treatment of $LiMn_2O_4$ forms a $\lambda$-$MnO_2$ which can be used in a positive electrode for electrochemical power sources. It was later discovered that the spinel $LiMn_2O_4$ could be used as the positive electrode for a secondary lithium cell. Thackery et al., *Material Research Bulletin*, 18, 461 (1983). Thackery et al. demonstrated that the potential-composition curves have two reversible plateaus, respectively at 4 and 2.8 V versus a lithium electrode.

The effect of synthesis temperature on the electrochemical performance of the secondary lithium cell using the 2.8 V plateau of spinel $LiMn_2O_4$ has been described in, e.g., U.S. Pat. No. 4,828,834 to Nagaura et al. Nagaura et al. determined that an optimal synthesis temperature for $LiMn_2O_4$ using lithium carbonate and manganese dioxide is in the range of between 430°–520° C. Using the 2.8 V charge-discharge plateau, Nagaura et al. also determined that $LiMn_2O_4$ compounds having a full width at half maximum between 1.1° and 2.1° of a peak 2θ equal to 46.1° by x-ray diffraction analysis using FeKα rays possess favorable cycling performance when used as the active material in cathodes for secondary lithium cells. Furthermore, Nagaura et al. teaches that spinels having a full width at half maximum less than 1.1° do not possess the desired discharging capacity.

Recently, the effect of the higher synthesis temperature on the reversible capacity of the 4 V plateau was described. V. Manev et al., *J. Power Sources*, 43–44, 551 (1993) and U.S. Pat. No. 5,211,933 to Barboux et al. Manev et al. determined that the synthesis of spinel $LiMn_2O_4$ for secondary lithium cells should be performed at temperatures lower than 750° C. Barboux et al. stated that low temperature processes between 200° and 600° C. yield finer size particles of $LiMn_2O_4$, do not affect the capacity of the electrolytic cells, and enhance the cycling behavior of the spinel.

The decrease in the capacity associated with the increase in the synthesis temperature at temperatures higher than 800° C. was explained by a significant oxygen loss at temperatures higher than 800° C. Manev et al., *J. Power Sources*, 43–44, 551 (1993).

In U.S. Pat. No. 5,425,932 to Tarascon, a different approach for employing synthesis temperatures greater than 800° C. was described which involves an additional slow cooling step with a cooling rate slower than 10° C./h in order to form a spinel with increased cell capacity. Even though this method may increase the capacity of the cell, it may be the source of considerable nonhomogeneous oxygen distribution in the final product, because the oxygen content is a function of firing temperature. For example, the oxygen content in the bulk may be lower than stoichiometric, while an oxygen rich spinel may form on the surface of the particles.

As described in R. J. Gummow et al. *Solid State Ionics*, 69, 59 (1994)), an infinite number of high lithium content stoichiometric spinel phases exist with a general formula $Li_{1+x}Mn_{2-x}O_4$ where ($0 \leq X \leq 0.33$). Gummow et al. also states that an infinite series of oxygen rich defect spinel phases exist with a general formula $LiMn_2O_{4+y}$ where ($0 \leq Y \leq 0.5$) The possibility that X and Y may have negative values has been described for the ranges $-0.15 \leq X \leq 0$ for $Li_xMn_2O_4$ in U.S. Pat. No. 5,425,932 to Tarascon and $-0.1 \leq Y \leq 0$ for $LiMn_2O_{4+y}$ in V. Manev et al., *J. Power Sources*, 43–44, 551 (1993)). As suggested by Gummow et al. and U.S. Pat. No. 5,425,932 to Tarascon et al., the variation of the lithium and oxygen content are accompanied by considerable variation of the spinel lattice parameters.

The existence of an infinite number of lithium manganese spinel phases and the existence of intermediate compounds, thermodynamically stable in the temperature range of spinel preparation but inactive in the 4 V discharge range, namely $Li_2MnO_3$ and $Mn_2O_3$, demonstrate that the preparation of highly homogenous spinel compounds is extremely complicated. However, a highly homogenous compound is desirable for positive electrodes of secondary lithium cells to provide high specific capacity and a negligible capacity fade as a function of the number of charge-discharge cycles.

SUMMARY OF THE INVENTION

The present invention provides a method of preparing a spinel $Li_{1+x}Mn_{2-x}O_{4+y}$ intercalation compound with low lattice distortion and a highly ordered and homogeneous structure for 4 V secondary lithium and lithium ion cells having high specific capacity and long cycling life.

The method of preparing a spinel $Li_{1+x}Mn_{2-x}O_{4+y}$ intercalation compound comprises providing a spinel $Li_{1+x}Mn_{2-x}O_4$ intercalation compound having a lithium to manganese mole ratio of between about 1.02:2 and 1.1:2 and firing the $Li_{1+x}Mn_{2-x}O_4$ spinel at a temperature of between about 750° C. and 900° C. for at least about eight hours in the presence of a gas flow with a flow rate of between about 0.001 l/gh and 0.1 l/gh to form a highly homogenous spinel with respect to the lithium/manganese ratio. The spinel is subsequently fired at a constant temperature of between 600° C. and 750° C. for at least about eight hours in the presence of a gas flow with a flow rate of between about 0.02 l/gh and 0.5 l/gh to increase the oxygen content of the highly homogenous spinel. The highly homogenous spinel is then cooled at a rate of greater than about 50° C. per hour in the presence of a gas flow with a flow rate of between about 0 l/gh and 1.0 l/gh. Alternately, prior to the second firing step, the highly homogenous spinel may be fired at a temperature of between about 400° C. and 550° C. for between about two and eight hours in the presence of a gas flow with a flow rate of between about 0.1 l/gh and 10 l/gh.

The spinel $Li_{1+x}Mn_{2-x}O_{4+y}$ intercalation compound prepared according to the present invention possesses greater homogeneity and lower lattice distortion than the spinel $Li_{1+x}Mn_{2-x}O_4$ intercalation compounds provided as the starting material. The spinel $Li_{1+x}Mn_{2-x}O_{4+y}$ intercalation compound of the present invention has a mean X value of between about 0.01 and 0.05, a mean Y value of between about −0.02 and 0.04, and a full width at half maximum of the x-ray diffraction peaks at a diffraction angle 2θ of planes 400 and 440 using $CuK\alpha_1$ rays of between about 0.08° and 0.13°. The ratio between the height of the minimum between $CuK\alpha_1$ and $CuK\alpha_2$ peaks of diffraction plane (440) and the height of the maximum of the $CuK\alpha_2$ peaks of diffraction plane (440) in the case of x-ray diffraction analysis using $CuK\alpha$ rays is between about 0.5 and 0.9 for the spinels of the invention. Additionally, the ratio between the integral intensity of the reflection (311) and the integral intensity of the reflection (400) in the case of x-ray diffraction analysis using $CuK\alpha$ rays is less than about 1. The mean crystallite size of the spinel $Li_{1+x}Mn_{2-x}O_{4+y}$ intercalation compounds is between about 5,000 to 30,000 angstroms. The highly ordered and homogeneous spinel $Li_{1+x}Mn_{2-x}O_{4+y}$ intercalation compounds may be used in positive electrodes for secondary lithium and lithium ion cells to provide cells having high specific capacity and long cycling life.

These and other features and advantages of the present invention will become more readily apparent to those skilled in the art upon consideration of the following detailed description and accompanying drawings which describe both the preferred and alternative embodiments of the present invention.

BRIEF-DESCRIPTION OF THE DRAWINGS

DETAILED DESCRIPTION OF THE INVENTION

Figure 1:
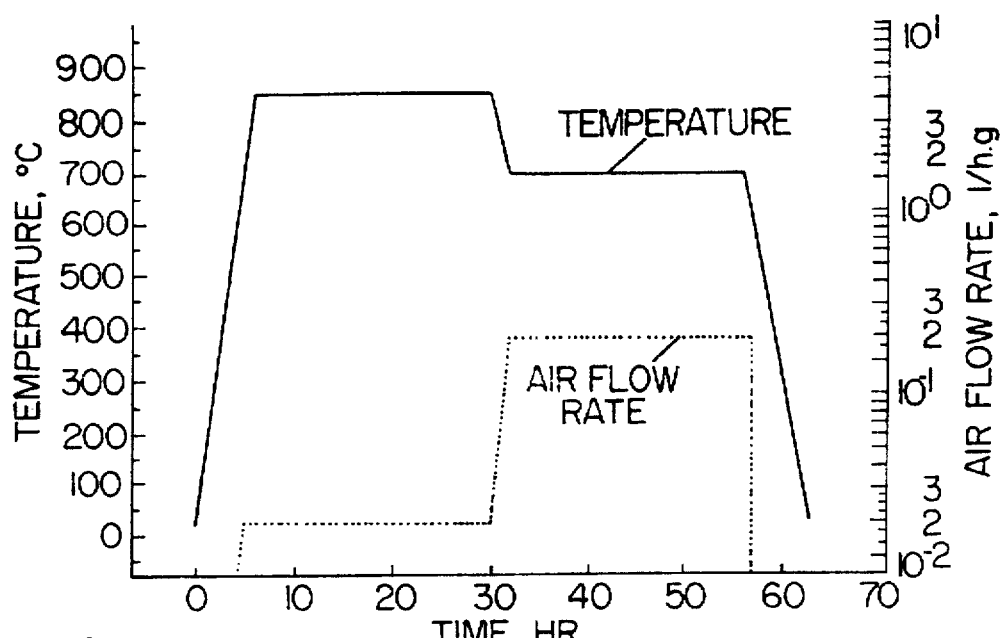
FIG. 1 is a diagram showing temperature and gas flow rate values as a function of synthesis time according to a preferred method of preparing the spinel $Li_{1+x}Mn_{2-x}O_{4+y}$ compound of the invention.

According to the method of the present invention, a low crystal lattice distortion spinel intercalation compound with a general formula $Li_{1+x}Mn_{2-x}O_{4+y}$ is prepared from a spinel $Li_{1+x}Mn_{2-x}O_4$ intercalation compound. The $Li_{1+x}Mn_{2-x}O_4$ spinel preferably has a lithium to manganese mole ratio of between about 1.02:2 and 1.1:2. More preferably, the $Li_{1+x}Mn_{2-x}O_4$ spinel has a mean X value from between about 0.01 to 0.05 and a full width at half maximum of the x-ray diffraction peaks at a diffraction angle 2θ of planes (400) and (440) using $CuK\alpha_1$ rays of between about 0.10° and 0.15°.

In order to form a spinel $Li_{1+x}Mn_{2-x}O_{4+y}$ intercalation compound having improved homogeneity, the $Li_{1+x}Mn_{2-x}O_4$ spinel starting material is first fired at a temperature range of between about 750° C. and 900° C., preferably between about 800° C. and 850° C., in the presence of a gas flow with a flow rate of between about 0.001 l/gh and 0.1 l/gh. The gas used in the gas flow is preferably air or a gas mixture having an oxygen content of between about 5 and 100% oxygen by volume. The high temperature used in the first firing step accelerates the reaction between the existing higher and lower lithium content spinels to form an extremely homogenous phase with respect to the lithium/manganese ratio. The use of a low gas flow rate prevents significant evolution of the lithium from the spinel and simultaneously delivers the amount of oxygen necessary for the chemical reactions producing spinel from $Mn_2O_3$(LiMnO$_2$ and Li$_2$MnO$_3$ which may still be present in the starting low homogeneity spinel. In addition to the combination of low air flow rate and high temperature, when considerable lithium evolution takes place, a favorable condition is created for lithium redistribution by mass transport through the gas phase. The temperature of the first firing step is preferably maintained for a soak time of at least about 8 hours, preferably at least about 24 hours, to form the spinel. Once the first firing step is concluded, the spinel material may be allowed to cool prior to any subsequent firing steps.

In a preferred embodiment of the invention, the spinel is subsequently fired at a constant temperature of between about 600° and 750° C., preferably between about 650° C. and 700° C., in the presence of a gas flow of between about 0.02 l/gh and 0.5 l/gh. The gas used is preferably air or a gas mixture containing oxygen as described above. Because the spinel loses a considerable amount of its oxygen content in the first firing step, the second firing step is provided in order to recover oxygen in the spinel. Maintaining a constant temperature within the temperature range of the second firing step is important in order to increase the uniformity of oxygen distribution in the spinel and to decrease the lattice distortion which may be caused by nonuniform oxygen distribution. In the temperature range of the second firing step, the mean oxygen content is essentially stoichiometric with respect to the spinel $Li_{1+x}Mn_{2-x}O_4$ intercalation compound. During the second firing, an appropriate gas flow rate is selected to facilitate recovery of the oxygen stoichiometry and to minimize the oxygen concentration gradient in the spinel particles. The temperature of the second firing step is maintained for a soak time of preferably at least about 8 hours, at least about 24 hours.

In an alternative preferred embodiment of the present invention, an additional firing step is provided prior to the second firing step. In the alternative preferred embodiment, the highly homogenous spinel compound is fired at a temperature of between about 400° and 550° C., preferably at least about 450° C. and 500° C., in the presence of a gas flow at a flow rate of between about 0.1 l/gh and 10 l/gh. The gas used in the gas flow is preferably air or a gas mixture containing oxygen as described above. The temperature of the additional firing step is preferably maintained for between about 2 and 8 hours. During this additional firing step, the temperature range and gas flow rate provide fast recovery of the oxygen lost during the first firing step because, in this temperature range, the nucleation of a high oxygen content spinel is thermodynamically favored. Once the additional firing step is completed, the spinel material may be allowed to cool prior to any subsequent firing steps. In any event, after the additional firing step, the spinel is subsequently fired at a constant temperature according to the second firing step described above to increase the uniformity of the oxygen distribution and to decrease the lattice distortion in the final product.

At the conclusion of the second firing step, the mixture is allowed to cool at a rate of greater than about 20° C. per hour and preferably greater than about 50° C. per hour with a gas flow rate of between about 0 and 1.0 l/gh. As described above with respect to the firing steps, the gas flow used during cooling can be air or a gas mixture containing oxygen.

Alternatively, the firing steps of the method described above may include changes in the temperature and the gas flow rate within the described ranges, with the exception of the temperature of the second firing step. In other words, the temperature and/or gas flow rate may be increased or decreased within their respective ranges during the firing steps. Additionally, the gas delivered to the spinel during the firing steps may vary in oxygen content and gases used during the firing steps may be changed. Although the firing temperatures in the first and second firing steps are preferably maintained for at least about 8 hours, longer soak times tend to provide an improved spinel compound. Nevertheless, the soak times are typically dictated by commercial feasibility and extremely long soak times may not be desired. As described above, the spinel material may be allowed to cool after a firing step is completed to a temperature below the subsequent firing step but, for reasons of efficiency, the firing steps are preferably performed consecutively without additional cooling of the spinel material below the subsequent firing range.

The spinel $Li_{1+x}Mn_{2-x}O_{4+Y}$ intercalation compounds prepared according to the present invention possess improved properties over conventional $Li_{1+x}Mn_{2-x}O_4$ spinels. The spinel $Li_{1+x}Mn_{2-x}O_{4+Y}$ of the invention is a highly ordered and homogeneous structure having a high specific capacity. The $Li_{1+x}Mn_{2-x}O_{4+Y}$ spinels prepared according to the present invention have a mean X value of between about 0.01 and 0.05 and a mean Y value of between about −0.02.and 0.04. The relatively small range of mean X values provides a spinel that exhibits a high initial capacity. In addition, the $Li_{1+x}Mn_{2-x}O_{4+Y}$ spinels of the present invention exhibit a full width at half maximum of the x-ray diffraction peaks at a diffraction angle 2θ of planes (400) and (440) using $CuK\alpha_1$ rays of between about 0.08° and 0.13° and preferably between about 0.08° and 0.10°. Spinel $Li_{1+x}Mn_{2-x}O_{4+Y}$ intercalation compounds having lower widths at half maximum have correspondingly lower random lattice distortion and narrower distribution of lithium/manganese ratios. The mean crystallite size of the spinel $Li_{1+x}Mn_{2-x}O_{4+Y}$ intercalation compounds is between about 5,000 to 30,000 angstroms.

The decrease of the width of the x-ray diffraction reflection peaks using CuKα rays naturally leads to splitting of some of the x-ray diffraction pattern peaks corresponding to $CuK\alpha_1$ (λ=1.54056 Å) and $CuK\alpha_2$ (λ=1.54440 Å) rays. Splitting the diffraction peaks of diffraction plane (440) can be successfully used as an indicator to predict the electrochemical performance of the spinel compound. An increase in the separation between the $CuK\alpha_1$ and $CuK\alpha_2$ peaks of diffraction plane (440) corresponds to an increase in the cycleability of the spinel $Li_{1+x}Mn_{2-x}O_{4+Y}$ compound. In particular, in the spinels of the invention, the ratio between the height of the minimum between $CuK\alpha_1$ and $CuK\alpha_2$ peaks of diffraction plane (440) and the height of the maximum of the $CuK\alpha_2$ peaks of diffraction plane (440) is between about 0.5 and 0.9 resulting in a capacity decrease during cycling of nearly zero.

In the present invention, separation of the $CuK\alpha_1$ and $CuK\alpha_2$ peaks of diffraction plane (440) is usually accompanied by a decrease in the ratio between the integral intensity of the reflection (311) and the integral intensity of the reflection (400) in the case of x-ray diffraction analysis using CuKα rays. The ratio between the integral intensity of the reflection (311) and the integral intensity of the reflection (400) in the case of x-ray diffraction analysis using CuKα rays is generally greater than 1 according to the ASTM and JCPDS cards. Nevertheless, when a separation of the $CuK\alpha_1$ and $CuK\alpha_2$ peaks of diffraction plane (440) takes place, the ratio usually is less than about 1.

This ratio and the separation of the CuKα peaks are indicative of spinel structures having increased electrochemical performance. In addition, when the spinel $Li_{1+x}Mn_{2-x}O_{4+Y}$ intercalation compounds prepared according to the present invention and having widths at half maximum in this range are used in the positive electrode of rechargeable lithium cells, the decrease in the specific capacity during cycling is negligible and thus the lithium cells exhibit long cycling lives.

The spinel $Li_{1+x}Mn_{2-x}O_{4+Y}$ intercalation compounds may be used in positive electrodes in electrochemical cells. The $Li_{1+x}Mn_{2-x}O_{4+Y}$ spinel material is typically combined with a conductive agent such as graphite or carbon black and a binder material such as polyvinylidene difluoride (PVDF) and dispersed in a solvent such as n-methyl pyrrolidinone (NMP) (e.g. 1methyl-2-pyrrolidinone) to form a slurry. The slurry is typically spread on aluminum and then heated to evaporate the solvent to form a dry electrode material. The dry electrode is then compressed by rolling, pressing, or other known methods, and cut into, for example, a disk, to form the positive electrode. The electrode is then placed inside an electrochemical cell with a lithium counterelectrode and an electrolyte such as $EC:DMC/LiPF_6$.

The present invention will be further illustrated by the following nonlimiting examples.

As used in these examples, the term "crystallite size" is defined with the presumption that all the crystallites are equivalent and have a cubic shape, using the following formula:

$$L=6/\rho A$$

wherein L is the crystallite length size, ρ is spinel density and A is the specific surface area measured by the BET method. Single point BET measurements were determined using a Quantachrome Monosorb BET instrument.

The planar spacing based on the 400 reflection peaks are calculated using the Bragg equation:

$$d=\lambda/2 \sin \theta$$

wherein $\lambda=1:54056$ Å and is the wavelength of CuKα₁ radiation.

The lattice parameter a, corresponding to the plane (400) is calculated using the following formula:

$$a^2=(i^2+j^2+k^2)d^2$$

where i, j, and k are the Miller indexes.

EXAMPLE 1

A highly homogeneous spinel $Li_{1+X}Mn_{2-X}O_{4+Y}$ compound with a mean X value of about 0.025 and a mean Y value nearly equal to 0 was prepared by firing a less homogeneous $Li_{1+X}Mn_{2-X}O_4$ spinel compound having a full width at half maximum of the diffraction peaks of planes (400) and (440) in the case of x-ray diffraction analysis using CuKα₁ rays of 0.144 and 0.168 degrees, respectively. Initially, the spinel starting material was fired for 24 h at about 850° C. with an air flow rate of 0.01 l/gh. Then, the reaction mixture was fired for 24 h at about 700° C., while the air flow rate was increased and maintained 0.5 l/gh. The mixture was cooled at a rate of 100° C. per hour with zero air flow. FIG. 1 is a diagram showing the temperature and air flow rate as a function of synthesis time for this example.

Figure 2A:
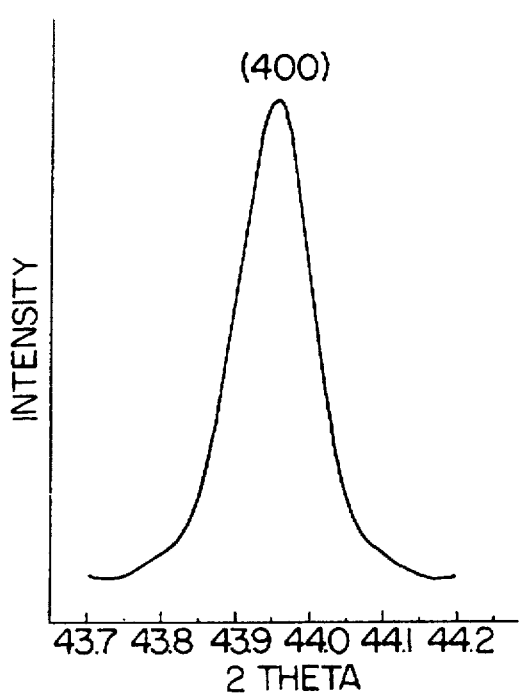
FIGS. 2A and 2B are x-ray diffraction profiles of the (400) and (440) reflection peaks using $CuK\alpha_1$ rays of the spinel $Li_{1+x}Mn_{2-x}O_{4+y}$ intercalation compound of the invention.
Figure 2B:
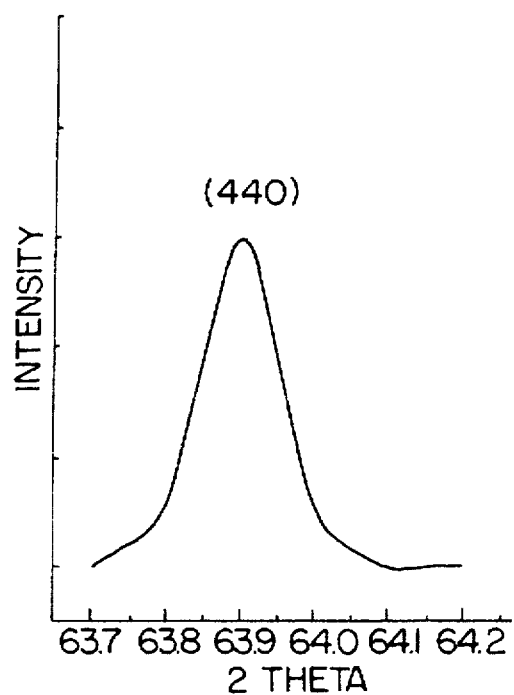
Figure 3:
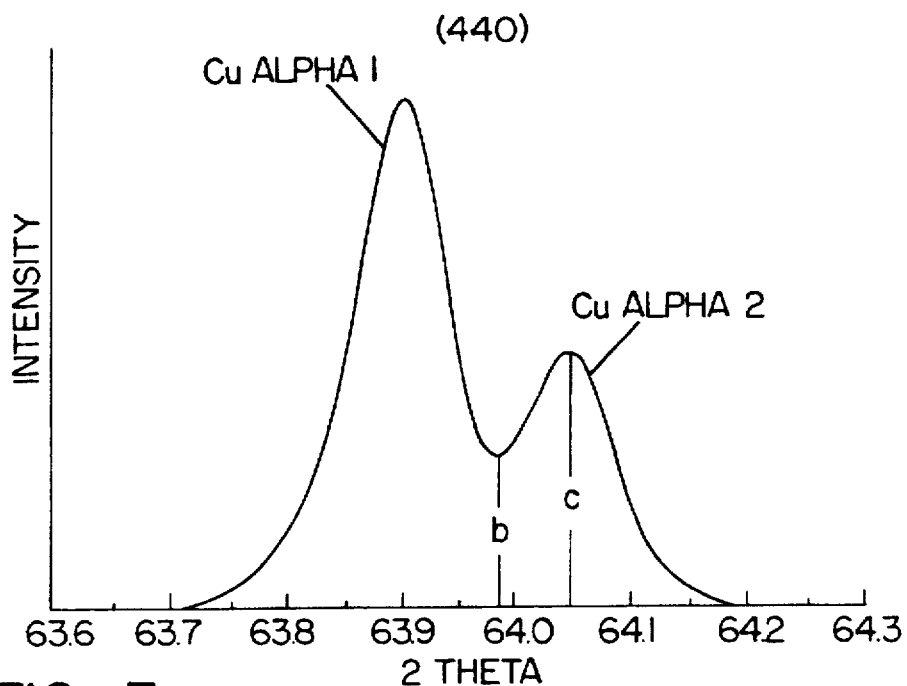
FIG. 3 is an x-ray diffraction profile of the (440) reflection peak using $CuK\alpha$ rays showing the separation of the $CuK\alpha_1$ and $CuK\alpha_2$ (440) reflection peaks of the spinel $Li_{1+x}Mn_{2-x}O_{4+y}$ intercalation compound of the invention.

FIGS. 2A and 2B are a graph illustrating the x-ray diffraction analysis of the resulting $Li_{1+X}Mn_{2-X}O_{4+Y}$ spinel using CuKα₁ rays. As shown in FIGS. 2A and 2B, the full width at half maximum of the diffraction peaks of planes (400) and (440) for 2θ were 0.092 and 0.108 degrees, respectively. The specific surface area measured by BET was 1.4 m²/g and the mean crystallite size was about 10200 Å. As illustrated in FIG. 3, the ratio between the height of the minimum between CuKα₁ and CuKα₂ peaks of diffraction plane (440) and the height of the maximum of the CuKα₂ peaks of diffraction plane (440) was 0.62. The ratio between the integral intensity of the reflection (311) and the integral intensity of the reflection (400) in the case of x-ray diffraction analysis using CuKα rays was 0.88.

The prepared spinel $Li_{1+0.025}Mn_{2-0.025}O_4$ compound was mixed with 10% graphite and 5% PVDF binder and dispersed in NMP solvent to form a slurry. The slurry was subsequently spread on Al foil and heated to evaporate the NMP solvent. The dry electrode was then pressed at 500 kg/cm² and cut into a disk test sample electrode having a diameter of about 1 cm and thickness of about 0.015 cm. The prepared test electrode was placed inside an electrochemical cell with a lithium counter electrode and an EC:DMC/LiPF₆ electrolyte. A charging-discharging test was carried out at a 1 h charge-discharge rate and 3–4.5 V voltage limits.

EXAMPLE 2

Figure 4:
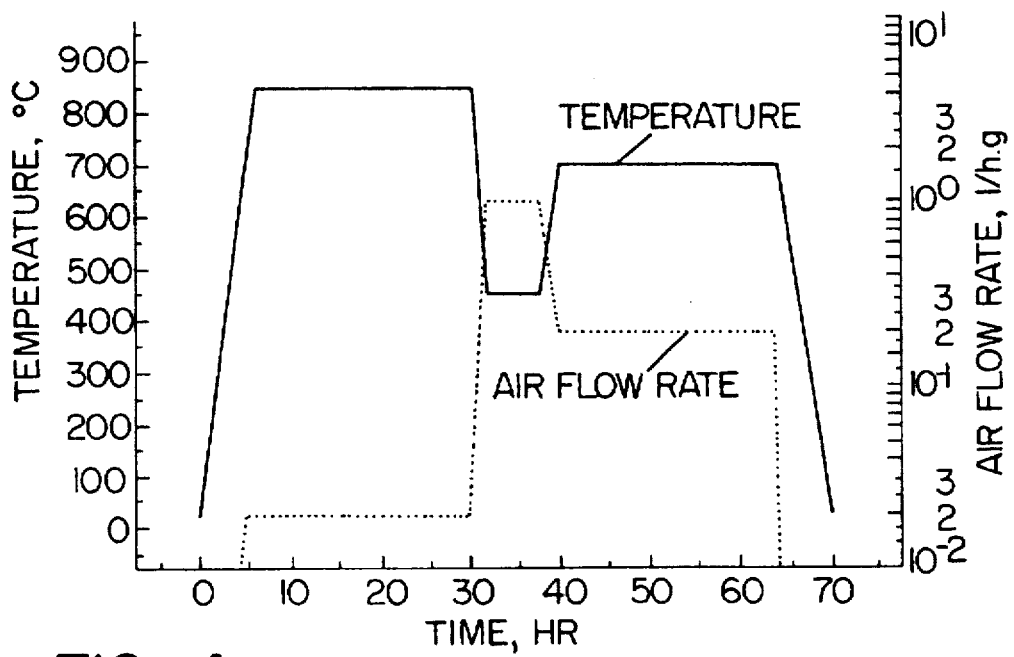
FIG. 4 is a diagram showing temperature and gas flow rate values as a function of synthesis time according to an alternative preferred method of preparing the spinel $Li_{1+x}Mn_{2-x}O_{4+y}$ compound of the invention.

A highly homogeneous spinel $Li_{1+X}Mn_{2-X}O_{4+Y}$ compound with a mean X value of about 0.025 and a mean Y value nearly equal to 0 was prepared by firing the spinel starting material used in Example 1. Initially, the spinel starting material was fired for 24 h at about 850° C. with an air flow rate of 0.01 l/gh. Then, the reaction mixture was fired for 8 h at 450° C. while the air flow rate was increased and maintained 0.5 l/gh. The spinel mixture was subsequently fired for 8 h at about 700° C. with an air flow rate 0.05 l/gh and cooled at a rate of 100° C. per hour with zero air flow. FIG. 4 is a diagram showing the temperature and air flow rate values as a function of synthesis time for this example.

The full width at half maximum of the diffraction peaks of planes (400) and (440) for 2θ were 0.098 and 0.116 degrees, respectively. The specific surface area measured by BET was 1.8 m²/g and the mean crystallite size was about 7900 Å. The ratio between the height of the minimum between CuKα₁ and CuKα₂ peaks of diffraction plane (440) and the height of the maximum of the CuKα₂ peaks of diffraction plane (440) was 0.68. The ratio between the integral intensity of the reflection (311) and the integral intensity of the reflection (400) in the case of x-ray diffraction analysis using CuKα rays was 0.93.

A spinel $Li_{1+0.025}Mn_{2-0.025}O_4$ positive test electrode was prepared and an electrochemical cell was assembled in the same manner as in Example 1. Additionally, the cell charge-discharge characteristics were measured under the same conditions as Example 1.

COMPARATIVE EXAMPLE 1

A spinel $Li_{1+X}Mn_{2-X}O_4$ compound with a mean X value of about 0.025 was prepared by heating together an intimate mixture of LiOH and MnCO₃ having a lithium/manganese mole ratio of 1.05:2. The mixture was fired at 750° C. for 72 h at an air flow rate of 1 l/gh. The mixture was then cooled at the rate 100° C. per hour with zero air flow.

An x-ray diffraction analysis of the resulting $Li_{1+X}Mn_{2-X}O_4$ spinel was conducted using CuKα₁ rays. The full width at half maximum of the diffraction peaks of planes (400) and (440) for 2θ were 0.308 and 0.374 degrees, respectively. The specific surface area measured by BET was 2.7 m²/g and the mean crystallite size was about 5300 Å. No separation in the CuKα₁ and CuKα₂ peaks of diffraction plane (440) was observed. The ratio between the integral intensity of the reflection (311) and the integral intensity of the reflection (400) in the case of x-ray diffraction analysis using CuKα rays was 1.18.

A spinel $Li_{1+0.025}Mn_{2-0.025}O_4$ positive test electrode was prepared and an electrochemical cell was assembled in the same manner as in Example 1. Additionally, the cell charge-discharge characteristics were measured under the same conditions as Example 1.

COMPARATIVE EXAMPLE 2

A spinel $Li_{1+X}Mn_{2-X}O_4$ compound with a mean X value of about 0.025 was prepared by heating together an intimate mixture of LiOH and MnCO₃ in the same mole ratio as Comparative Example 1. The mixture was fired in two consecutive temperature ranges and with the same duration as Example 1 but at a constant air flow rate of 1 l/gh. Initially, the mixture was fired for 24 h at 450° C. with an air flow rate of 1 l/gh. Then, the reaction mixture was fired for 48 h at 550° C., with an air flow rate of 1 l/gh. The temperature was further increased to 750° C. for 72 h at the same air flow rate of 1 l/gh. The mixture was subsequently cooled at a rate of 100° C. per hour with zero air flow.

An x-ray diffraction analysis of the resulting $Li_{1+X}Mn_{2-X}O_4$ spinel was conducted using CuKα₁ rays. The full width at half maximum of the diffraction peaks of planes (400) and (440) for 2θ were 0.216 and 0.262 degrees, respectively. The specific surface area measured by BET was 2.8 m²/g and the mean crystallite size was about 5100 Å. No separation in the CuKα₁ and CuKα₂ peaks of diffraction plane 440 was observed. The ratio between the integral intensity of the reflection (311) and the integral intensity of the reflection (400) in the case of x-ray diffraction analysis using CuKα rays was 1.09.

A spinel $Li_{1+0.025}Mn_{2-0.025}O_4$ positive test electrode was prepared and an electrochemical cell was assembled in the same manner as in Example 1. Additionally, the cell charge-discharge characteristics were measured under the same conditions as Example 1.

COMPARATIVE EXAMPLE 3

A spinel $Li_{1+x}Mn_{2-x}O_4$ compound with a mean X value of about 0.025 was prepared by heating together an intimate mixture of LiOH and $MnCO_3$ in the same ratio as in Comparative Example 1. Initially, the mixture was fired for 24 h at about 450° C. with an air flow rate of 4 l/gh. Then, the reaction mixture was fired for 48 h at about 550° C., while the air flow rate was decreased and maintained in the range of 0.5 l/gh. Next, the mixture was fired at about 750° C. for 72 h, while the air flow rate was decreased and maintained at 0.1 l/gh. The mixture was subsequently cooled at a rate of 100° C. per hour with zero air flow.

An x-ray diffraction analysis of the resulting $Li_{1+x}Mn_{2-x}O_4$ spinel was conducted using $CuK\alpha_1$ rays. The full width at half maximum of the diffraction peaks of planes (400) and (440) for $2\theta$ were 0.124 and 0.146 degrees, respectively. The specific surface area measured by BET was 3.1 $m^2/g$ and the mean crystallite size was about 4600 Å. No separation in the $CuK\alpha_1$ and $CuK\alpha_2$ peaks of diffraction plane (440) was observed. The ratio between the integral intensity of the reflection (311) and the integral intensity of the reflection (400) in the case of x-ray diffraction analysis using $CuK\alpha$ rays was 0.98.

A spinel $Li_{1+0.025}Mn_{2-0.025}O_4$ positive test electrode was prepared and an electrochemical cell was assembled in the same manner as in Example 1. Additionally, the cell charge-discharge characteristics were measured under the same conditions as Example 1.

Figure 5:
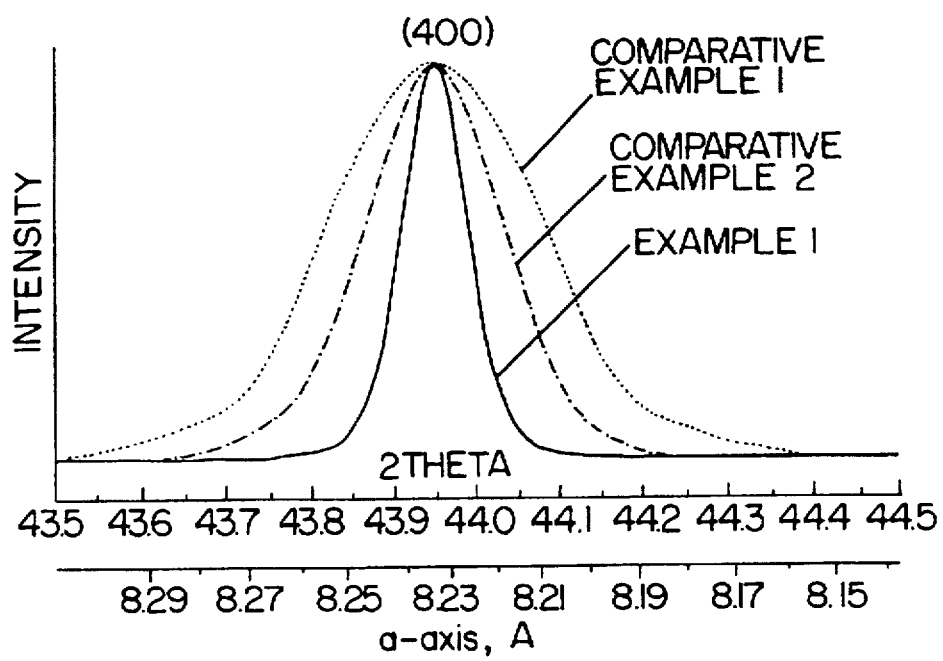
FIG. 5 is a graph illustrating the comparison between the x-ray diffraction profiles corresponding to $CuK\alpha_1$ rays of the (400) reflection peak of the spinel $Li_{1+x}Mn_{2-x}O_{4+y}$ material of the present invention and comparative examples, displayed on the second x-axis as a function of the lattice a-axis parameter of the unit cell.

FIG. 5 illustrates the comparison between the x-ray diffraction profiles corresponding to $CuK\alpha_1$ rays of the (400) reflection peak of the spinel $Li_{1+x}Mn_{2-x}O_{4+y}$ compound of Example 1, and the compounds of Comparative Examples 1 and 2. On the second x-axis of the same graph, the respective a-axis values for $2\theta$ of the spinel unit cell in Å are shown.

For crystal compounds with a crystallite size higher than 3,000 angstroms, x-ray divergence due to crystallite size does not take place in x-ray diffractometry which employs wavelengths of several angstroms. Thus, the different (400) plane profiles observed in FIG. 5 are based on different degrees of lattice distortion. This is supported by the fact that the mean crystallite sizes of the spinels prepared according to Example 1 and Comparative Examples 1 and 2 are almost the same.

As shown in FIG. 5, the plane profiles correspond to the lattice distortion distribution and to the a-axis distribution in the final product. The data presented in FIG. 5 demonstrates that in conventionally prepared spinel compounds prepared according to Comparative Examples 1 and 2, numerous spinel phases having a-axis values which vary in the range of 0.05–0.1 angstroms may simultaneously coexist. This distortion causes permanent internal stress in the crystallites and can be a source of fast crystallite deterioration during cycling when additional changes of the lattice parameter take place.

Figure 6:
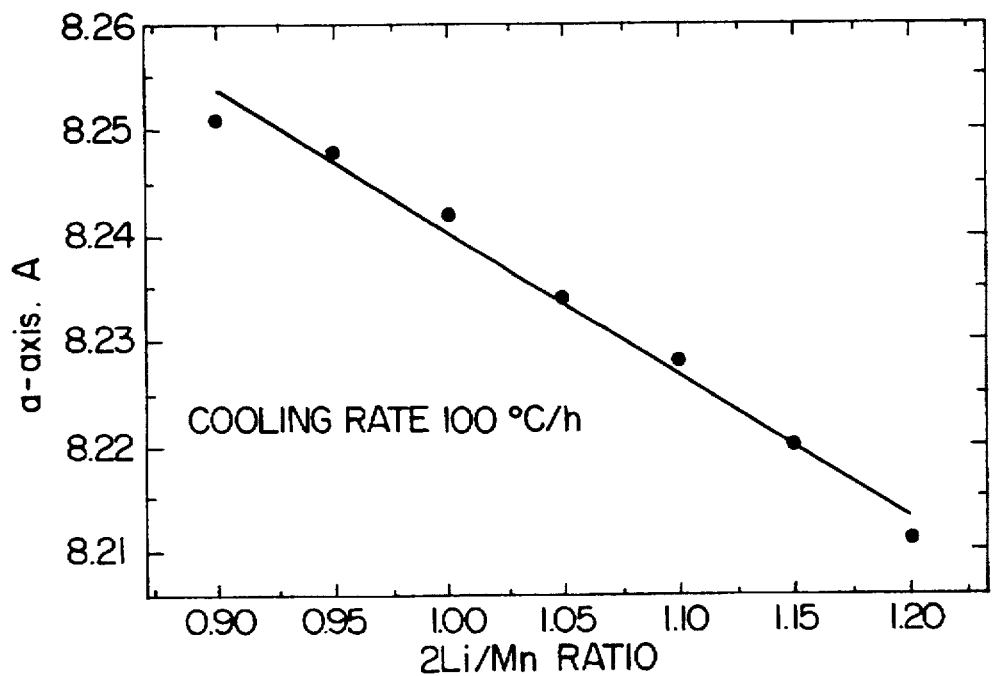
FIG. 6 is a graph trace showing the variation of the a-axis of the unit cell parameters versus the lithium/manganese ratio of the spinel of the present invention at a cooling rate of 100° C./h.

The coexistence of the infinite sequences of high and low lithium content spinels with a general formula $Li_{1+x}Mn_{2-x}O_{4+y}$ wherein X can have infinite numbers of values is illustrated in FIG. 6, where the variation of the a-axis unit cell parameters corresponding to the mean lithium/manganese ratio in the $Li_{1+x}Mn_{2-x}O_{4+y}$ compounds with Y=0, obtained at a comparatively high cooling rate of about 100° C./h is shown.

Figure 7:
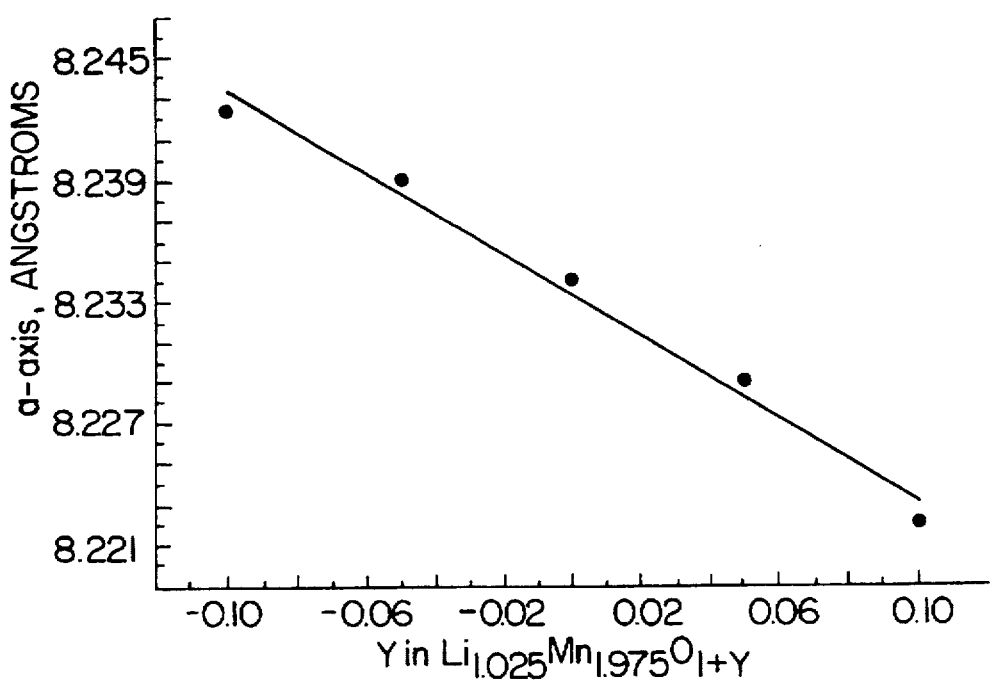
FIG. 7 is a graph trace showing the variation of the a-axis of the unit cell parameters versus the oxygen content of the spinel $Li_{1.025}Mn_{1.975}O_{4+y}$ of the invention.
Figure 8:
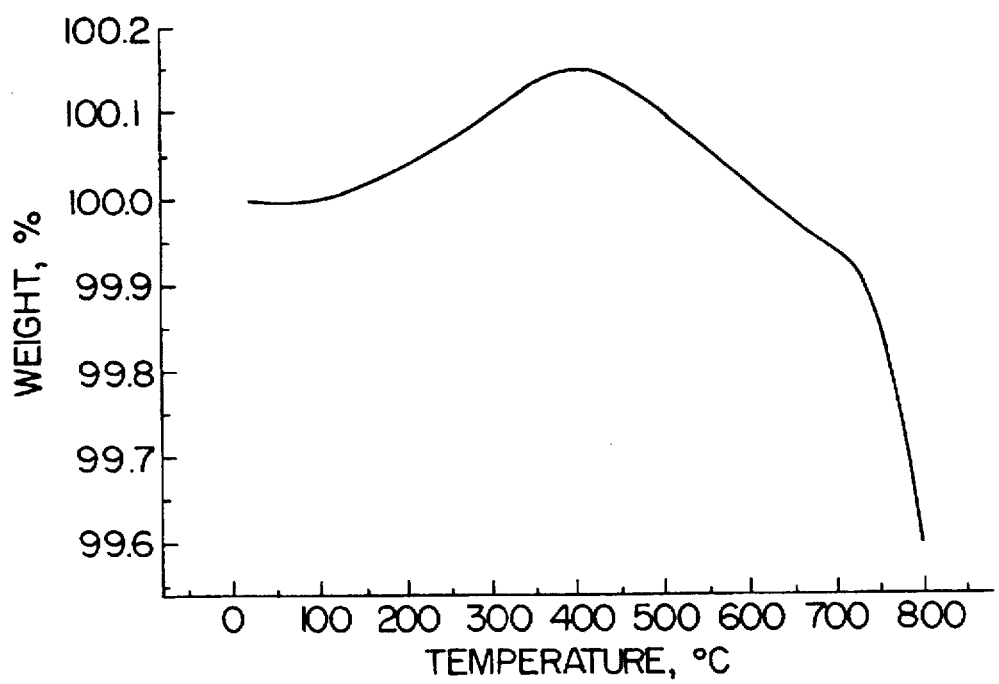
FIG. 8 is a graph trace obtained by thermogravimetric analysis showing the comparative weight loss of oxygen versus the heating temperature of the spinel $Li_{1.025}Mn_{1.975}O_{4+y}$ compound of the invention.

FIG. 7 presents a graph trace showing the variation of the a-axis of the unit cell parameters corresponding to the oxygen content in the spinel $Li_{1+x}Mn_{2-x}O_{4+y}$ compounds at a fixed lithium content corresponding to X=0.025. FIG. 8 presents a graph trace obtained by thermogravimetric analysis (TGA) showing the comparative weight loss of oxygen corresponding to the heating temperature of the $Li_{1.025}Mn_{1.975}O_{4+y}$ compound.

FIGS. 6 and 7 show that the variation of lithium and the variation of the oxygen content in the $Li_{1+x}Mn_{2-x}O_{4+y}$ compound have a similar impact on the a-axis of the lattice parameter. Thus, the coexistence of higher and lower oxygen content phases than the mean oxygen content may cause considerable lattice distortion. For multiphase $Li_{1+x}Mn_{2-x}O_{4+y}$ compounds, the lattice distortion may be mainly due to random distortion caused by simultaneous coexistence of spinel phases which are richer in lithium, richer in oxygen, poorer in lithium and poorer in oxygen than the mean value of spinel compound.

As illustrated herein, the full width at half maximum of the peaks of diffraction planes reflects to the lattice distortion, homogeneity, and impurity level of the spinel $Li_{1+x}Mn_{2-x}O_{4+y}$ compound. All of these parameters have a considerable impact on the spinel cycleability. The full width at half maximum values of the reflection (400) and (440) peaks are highly reproducible and thus may be used as a reference for spinel $Li_{1+x}Mn_{2-x}O_{4+y}$ electrochemical performance.

Figure 9:
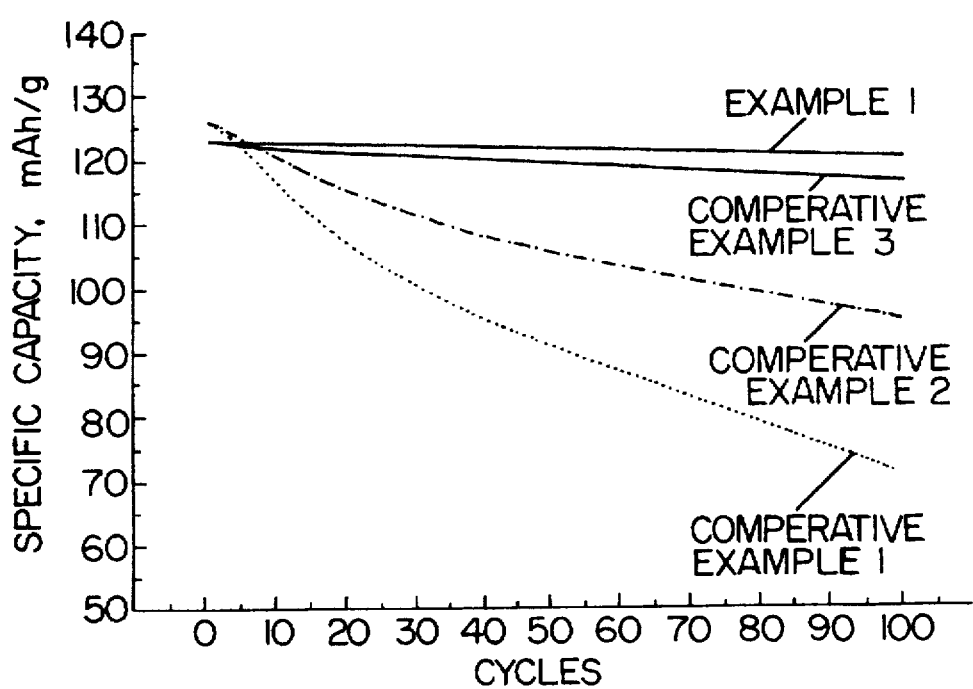
FIG. 9 is a graph illustrating the dependence of discharge specific capacities on the charge-discharge cycle numbers of the spinel $Li_{1+x}Mn_{2-x}O_{4+y}$ compound of the present invention and of the comparative examples.

FIG. 9 shows the dependence of discharge specific capacities on the charge-discharge cycle numbers of the spinel $Li_{1+x}Mn_{2-x}O_{4+y}$ compounds of Example 1 and the comparative examples. As shown in FIG. 9, spinel $Li_{1+x}Mn_{2-x}O_{4+y}$ intercalation compounds formed according to the present invention maintain their specific capacity after numerous cycles and therefore exhibit long cycling life.

It is understood that upon reading the above description of the present invention, one skilled in the art could make changes and variations therefrom.

These changes and variations are included in the spirit and scope of the following appended claims.

That which is claimed:

1. A $Li_{1+x}Mn_{2-x}O_{4+y}$ spinel having a mean X value of between about 0.01 to 0.05, a mean Y value of between about −0.02 and 0.04, and a full width at half maximum of the x-ray diffraction peaks at a diffraction angle $2\theta$ of planes (400) and (440) using $CuK\alpha_1$ rays of between about 0.080 and 0.13°.

2. The $Li_{1+x}Mn_{2-x}O_{4+y}$ spinel according to claim 1, wherein the ratio between the integral intensity of the reflection (311) and the integral intensity of the reflection (400) in the case of x-ray diffraction analysis using $CuK\alpha$ rays is less than about 1.

3. The $Li_{1+x}Mn_{2-x}O_{4+y}$ spinel according to claim 1, wherein the mean crystallite size of the spinel is between about 5,000 and 30,000 angstroms.

4. A $Li_{1+x}Mn_{2-x}O_{4+y}$ spinel having a mean X value of between about 0.01 to 0.05, a mean Y value of between about −0.02 and 0.04, and having a ratio between the height of the minimum between $CuK\alpha_1$ and $CuK\alpha_2$ peaks of diffraction plane (440) and the height of the maximum of the $CuK\alpha_2$ peaks of diffraction plane (440) in the case of x-ray-diffraction analysis using $CuK\alpha$ rays of between about 0.5 and 0.9.

5. The $Li_{1+x}Mn_{2-x}O_{4+y}$ spinel according to claim 4, wherein the ratio between the integral intensity of the reflection (311) and the integral intensity of the reflection (400) in the case of x-ray diffraction analysis using CuKα rays is less than about 1.

6. The $Li_{1+x}Mn_{2-x}O_{4+Y}$ spinel according to claim 4, wherein the mean crystallite size of the spinel is between about 5,000 and 30,000 angstroms.

7. A positive electrode for an electrochemical cell comprising:

a $Li_{1+x}Mn_{2-x}O_{4+Y}$ spinel having a mean X value of between about 0.01 to 0.05, a mean Y value of between about −0.02 and 0.04, and a full width at half maximum of the x-ray diffraction peaks at a diffraction angle 2θ of planes (400) and (440) using $CuK\alpha_1$ rays of between about 0.08° and 0.13°;

a conductive agent; and a binder material.

8. The positive electrode according to claim 7, wherein the ratio between the integral intensity of the reflection (311) and the integral intensity of the reflection (400) in the case of x-ray diffraction analysis using CuKα rays is less than about 1.

9. The positive electrode according to claim 7, wherein the mean crystallite size of the spinel is between about 5,000 and 30,000 angstroms.

10. A positive electrode for an electrochemical cell comprising:

a $Li_{1+x}Mn_{2-x}O_{4+Y}$ spinel having a mean X value of between about 0.01 to 0.05, a mean Y value of between about −0.02 and 0.04, and having a ratio between the height of the minimum between $CuK\alpha_1$ and $CuK\alpha_2$ peaks of diffraction plane (440) and the height of the maximum of the $CuK\alpha_2$ peaks of diffraction plane (440) in the case of x-ray diffraction analysis using CuKα rays of between about 0.5 and 0.9, a conductive agent; and a binder material.

11. The positive electrode according to claim 10, wherein the ratio between the integral intensity of the reflection (311) and the integral intensity of the reflection (400) in the case of x-ray diffraction analysis using CuKα rays is less than about 1.

12. The positive electrode according to claim 10, wherein the mean crystallite size of the spinel is between about 5,000 and 30,000 angstroms.

* * * * *

UNITED STATES PATENT AND TRADEMARK OFFICE
CERTIFICATE OF CORRECTION

PATENT NO.    : 5,766,800
DATED         : June 16, 1998
INVENTOR(S)   : Manev et al.

It is certified that error appears in the above-identified patent and that said Letters Patent is hereby corrected as shown below:

On title page, item [56]

In the References Cited, for patent 5,110,696, "Shokoohi" should be --Shokoohi et al.--.

In the References Cited, for patent 5,474,959, "Schäet al." should be "Schäfer et al.--.

Column 10, line 47, "0.080" should be --0.08°--.

Signed and Sealed this

Sixth Day of October, 1998

Attest:

BRUCE LEHMAN

*Attesting Officer*  *Commissioner of Patents and Trademarks*